United States Patent

Nicholas

[15] 3,703,697
[45] Nov. 21, 1972

[54] RELATIVE HUMIDITY SENSOR

[72] Inventor: Merle E. Nicholas, Minneapolis, Minn.

[73] Assignee: Honeywell Inc., Minneapolis, Minn.

[22] Filed: June 23, 1971

[21] Appl. No.: 155,919

[52] U.S. Cl. ..................338/35, 73/335, 200/61.06, 340/235
[51] Int. Cl. ............................................H01c 13/00
[58] Field of Search ....338/35, 34; 200/61.04, 61.05; 73/335, 336.5, 338; 340/235; 252/461, 472

[56] References Cited

UNITED STATES PATENTS 3,345,596   10/1967   Delaney et al...............338/35
3,369,880   2/1968    Mochell...................338/35 X Primary Examiner—C. L. Albritton
Attorney—Lamont B. Koontz

[57] ABSTRACT

An essentially full range resistance type relative humidity sensing element is produced by providing a dielectric blank, on which an electrode system has been applied, with a metal oxide coating, in a manner which imparts a porous structure thereto, and subsequently chemically bonding chlorine covalently into the oxide to produce an oxychloride structure. The metal oxide used is selected from a group, including those of Group VIII, Period 4 of the Periodic Table, which exhibit electrical insulating properties, the amount of electrical resistance thereof being dependent on the relative humidity of the environment to which it is exposed. The sensing element thus produced exhibits a much lower total electrical resistance coupled with a narrower range of variation in resistance produced by changes in relative humidity whereby rendering it compatible with ordinary electrical resistance measuring devices.

6 Claims, 3 Drawing Figures

RELATIVE HUMIDITY SENSOR

BACKGROUND OF THE INVENTION

1. Field of the Invention

The present invention relates broadly to relative humidity sensing devices and, more particularly, to a specially treated, metal oxide resistance-type moisture sensitive element and method of fabrication.

Reference is made to the inventor's copending application of even date, assigned to the same assignee, now Ser. No. 155,987, which is also generally concerned with a modified metal oxide relative humidity sensor. By that invention a sensor is produced characterized by a moisture sensitive medium comprising a metal oxide impregnated with a humectant material which is not chemically bonded to the oxide; whereas the present invention is particularly concerned with a relative humidity sensor having a moisture-sensitive medium comprising a covalently bonded metal oxychloride.

2. Description of the Prior Art

It has long been known that the oxides of certain metals exhibit properties of high electrical resistance which make them insulating in nature. It has also been recognized that this electrical resistance, while extremely high, is also dependent on the relative humidity of the air to which the metal oxide is exposed. The term "relative humidity," as commonly defined and used herein, refers to the ratio of the amount of water vapor contained in the air to that amount which would saturate air at the same temperature. Attempts have been made in the prior art to utilize the relative humidity dependent resistance properties inherent in such materials to produce humidity sensitive elements. An example of this is found in a patent issued to R. A. Delaney et al., U.S. Pat. No. 3,345,596, issued Oct. 3, 1967. That disclosure illustrates and describes a metal oxide-type humidity sensing device in which the resistance element is composed of amorphous cobalt-cobaltic oxide ($Co_3O_4$), heat treated above a specific temperature range to produce a highly crystalline surface in which the cobalt-cobaltic oxide is transformed into cobaltous oxide ($CoO$) which exhibits hygroscopic properties.

Attempts have also been made to utilize the hygroscopic properties of certain metal salts to provide a path of electrical conductance between electrodes in a humidity sensing device. One such device is illustrated and described in a patent to S. W. Gillingham, U.S. Pat. No. 2,510,018, issued May 30, 1950. That device proposes to utilize nickel nitrate, an ionic salt, as the sole conducting mechanism between two nickel alloy wire electrodes in much the same fashion as other well-known hygroscopic materials, such as lithium chloride, have also been employed.

While such prior art devices have been employed to sense relative humidity, they have been only partially successful. Thus, the metal oxide-type devices found in the prior art, of which the first above-mentioned patent is an example, have several drawbacks which severely limit their usefulness. While such devices do exhibit an electrical resistance which is dependent on the relative humidity of the air to which they are exposed, it has been found that the usable range of such devices, for practical purposes, is limited to a relative humidity range which extends above 30 percent relative humidity. The overall resistance of these devices is still extremely high and, in order to measure the full relative humidity range, they require a metering device capable of accurately covering a span of up to six orders of magnitude in the resistance change, i.e., typically from about $10^4$ to $10^{10}$ ohms. On the low end of the range, below about 30 percent relative humidity, the resistance is extremely high and is very difficult to accurately monitor. Thus, in this high resistance range, conductance across the uncoated opposite face of the dielectric substrate becomes a factor which interferes with attempts to accurately measure the resistance of the sensing medium alone.

In other devices, such as that of the second example given above which employ a metal salt as both the conducting and hygroscopic medium, while the range in value of the resistance is considerably reduced over the pure oxide type sensors, thereby bringing them within the range within the scope of standard measuring equipment, such devices, while responding readily to increases in relative humidity, do not respond well as the relative humidity cycles from a relatively high value to a lower value. In other words, such metal salts do not exhibit the degree of reversibility which is desired for a reliable relative humidity sensing device.

SUMMARY OF THE INVENTION

By means of the present invention, there is produced a unique sensing element which exhibits desirable qualities not found in the prior art devices while overcoming the limitations associated with those devices. A base member formed of a dielectric, substantially inert material and supplied with a suitable electrode system is treated in a manner which creates a conductive path between the electrodes through a humidity resistance material comprising a stable, highly porous metal oxide coating containing chlorine covalently bonded to the oxide forming an oxychloride structure. The sensing element thus produced not only exhibits a much lower total electrical resistance than the oxide alone but also achieves a narrower range of variation in resistance with change in relative humidity than was possible with prior oxide-type sensors thereby greatly facilitating adaptation to essentially full range use. In addition, the open porous structure of the coating achieved by the process of the invention significantly improves both the response time of the sensor to change in relative humidity and enhances its ability to form the oxychloride. Humidity sensing elements made in accordance with the present invention have been found to be completely reversible, as the relative humidity raises and lowers. They exhibit virtually no calibration drift due to hysteresis and, due to the physical and chemical stability of the coating, remain useful for a long period of time. Sensors produced in accordance with the present invention may be made extremely small in size and are completely compatible with solid state or other circuitry. This renders such sensors readily adaptable for such uses as in rectifier circuits for proportional humidifiers or in conjunction with other applications of electrical circuitry.

BRIEF DESCRIPTION OF THE DRAWINGS

In the drawings, wherein like numerals are employed to designate like parts throughout the same.

DESCRIPTION OF THE PREFERRED EMBODIMENT

Figure 1:
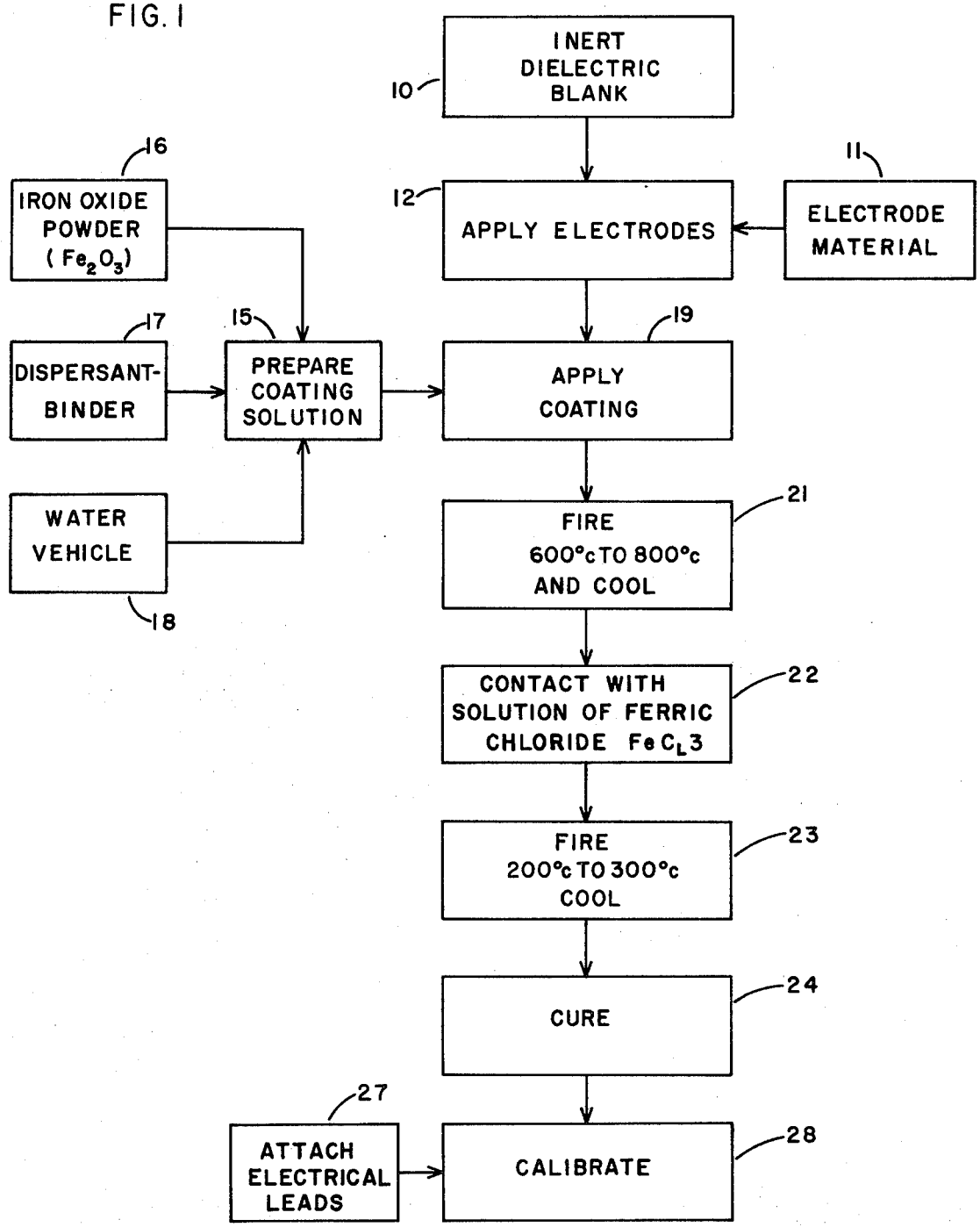
FIG. 1 is a block flow diagram illustrating the preferred method for fabricating the device of the present invention.
Figure 2:
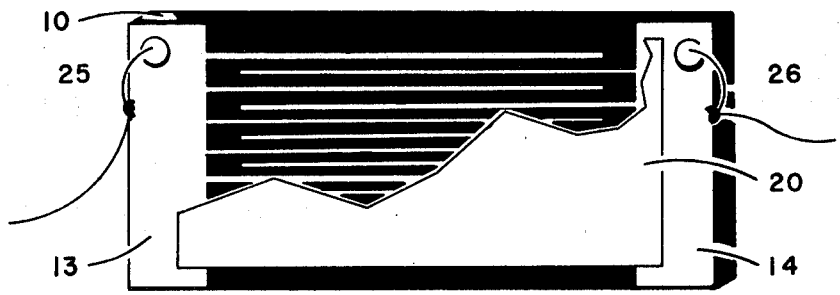
FIG. 2 is an enlarged plan view of the invention with parts cut away showing the under layers in the structure.

Referring now to the drawings and, more particularly, to the graphic flow diagram illustrated in FIG. 1, there is shown summarily a step-wise process for producing the sensor illustrated in FIG. 2. The inert dielectric blank 10 forms the basic substrate upon which the active components of the sensing element are applied. The material forming the dielectric blank 10 may be any relatively rugged dielectric material which is not affected by the presence of water vapor in the air and does not chemically react with the materials forming the electrodes thereon or with the materials forming the sensitive resistor. Quartz is an example of a material that has been used successfully to produce sensors in accordance with the invention and it is contemplated that other substantially inert materials would also be readily adaptable to such use.

The size of the blank 10 which, of course, determines the size of the humidity sensor ultimately produced therefrom, is not critical and may be any size convenient for the required application of the sensor. In fact, one of the distinct advantages of the present invention is that the sensors themselves can be made extremely small. Thus, in accordance with the present invention, highly successful sensors have been made having an overall size as small as approximately 0.45 inches long by 0.2 inches wide by 0.03 inches thick.

The material 11 forming the electrodes may be any noble metal conventionally used for such purposes. Thus, gold, palladium and platinum have been successfully used. The application 12 of the electrodes 13 and 14 (FIG. 2) may be accomplished using any appropriate conventional method. One representative technique which has been used to produce the electrodes of the present invention involves coating sections of the blank material 10 large enough to provide a plurality of finished sensing elements with a solution containing the noble metal of the electrodes, firing the coated blank material at a sufficiently elevated temperature, and in an appropriate atmosphere, to reduce the metal and cause it to adhere to the blank material. The desired configuration of the electrodes is then achieved by placing a photoresistor upon the metal film and stabilizing the desired areas using a mask and ultraviolet light. The metal not required for the electrodes is then removed by chemical etching techniques. The larger blank is then sectioned in a conventional manner into the individual sensors for the next step in the process. While no particular electrode configuration is required, one resembling oppositely disposed intermeshed comb teeth (known also as an interdigital electrode system) is preferred as it increases the adjacent surface length of the opposite electrodes to increase the efficiency of the conductance therebetween. The increased adjacent surface length provided by such an interdigital electrode system, of course, becomes increasingly important as the overall size of the sensor is decreased as it provides a more efficient use of the surface area of the blank member 10.

As discussed above, it is well known that the oxides of many metals, when in a relatively pure form, exhibit the high resistance of electrical insulators. It is also known that certain of these metal oxides are somewhat hygroscopic in nature which affects their insulating properties such that when exposed to an atmosphere containing a quantity of water vapor, the value of the electrical resistance changes in relation to the amount of water vapor in the atmosphere. While any insulating metal oxide will exhibit some of the properties desired for relative humidity sensing in accordance with the present invention, desirable properties including humidity dependent resistance and a high degree of chemical stability are especially prevalent in the oxides and the metals of Group VIII, Period 4 of the Periodic Table of the Elements. Thus, while others may used, the oxides of iron, nickel and cobalt are preferred in accordance with the present invention. Representative successful sensors have been made utilizing nickel oxide ($Ni_2O_3$), nickelous oxide (NiO) and iron oxide ($Fe_2O_3$). While the iron oxide ($Fe_2O_3$) will be used in the present description of the preferred embodiment of the invention, it is contemplated that any metal oxide exhibiting the required properties may be substituted for the iron oxide in the humidity sensing element of the invention.

One successful method of preparing the coating solution 15 for the sensor of the invention involves mixing finely divided reagent grade iron oxide ($Fe_2O_3$) powder 16 with a small amount of a binder material 17, for example, polyvinyl alcohol, and a sufficient amount of pure water 18 to provide a good ball-milling slurry. The slurry is rotated in a ball mill to disperse the oxide particles in the mixture. The finished slurry is then brought to the proper concentration with additional pure water. While the composition is not thought to be critical, a typical coating solution contains from about 2.0 to 5.0 percent of the metal oxide, from 0.01 to 0.05 percent of the binder and the balance pure water. One specific coating mixture used successfully includes 3.72 percent $Fe_2O_3$, 0.03 percent polyvinyl alcohol and the balance pure water.

The completed solution is then coated, at 19, on the sensor blank 10, overlapping the electrodes, preferably by spraying to produce a more uniform coating. The coating 20 may be sprayed on by any conventional type solution spraying device which produces a uniform layer. The film may be applied in one thick layer, but is preferably applied in successive thin layers with intermediate drying therebetween. It may be noted, that the final thickness of the coating in accordance with the present invention has not been found to be critical. Thus, any coating which is sufficient to produce a good electrical path between the electrodes, yet not thick enough to crack or peel, has been found to be adequate.

The firing step 21 involves heating the coated blank 10 to a temperature in the range of 600° C to 800° C, soaking or holding it in that temperature range for a period of time sufficient to pyrolyze and remove the binder by evaporation, give cohesion to the metal oxide film and adhesion between the film and the sensor blank 10, normally from about one to two hours in length. In connection with this step, the coated blanks 10 are typically fired at 700° C for a period of 1½ hours. The firing step 21 also accomplishes another important objective inasmuch as the vaporization of the binder imparts a porous structure to the metal oxide coating remaining on the blank 10. This porosity has been found to be extremely beneficial both from the standpoint of facilitating the combination of the oxide with the metal salt, which is described below in accordance with the step 22, and in increasing the effective surface area which ultimately is exposed to the atmosphere, the humidity of which is to be measured, thereby increasing the efficiency of the device. In this regard, polyvinyl alcohol has been found to be an excellent binder and, upon pyrolysis and evaporation, imparts a highly porous structure to the iron oxide coating.

An important aspect of the invention is the modification of the porous coating to convert the purely oxide structure to an oxychloride form. Accordingly, the coating is treated at 22 with a compound containing available chloride ions and exposed to a second firing step 23 to incorporate the chloride covalently into the oxide structure, and volatize any uncombined reactants. While any one of many compounds having readily available chloride ions may be used, excellent results have been obtained by using a solution of a metal salt such as ferric chloride ($FeCl_3$), for example. Neither the temperature nor the duration of the firing step 23 have been found to be critical to the process so long as both are adequate to achieve the desired results; and such will, of course, depend on the particular source of chloride ions used. With the ferric chloride source, holding the blank in the range of from about 200° C to 300° C for about one-half to 1 hour produces good results. Thus, one method successfully employed includes dipping the prepared blank into an aqueous solution of ferric chloride containing approximately 5 percent of the salt and subsequently firing the dipped blank at 250° C for 1 hour.

It is not known what portion of the oxide comprising the porous coating is converted into the oxychloride form. It is thought, however, that only a partial conversion is required to achieve the radical change in the electrical resistance behavior of the coating (described below) associated with the relative humidity sensitivity of the present invention.

A final step in preparing the sensor for use as a relative humidity responsive element is the curing step 24. The response of most relative humidity sensitive elements has been found to be somewhat erratic when such elements are first exposed to changes in relative humidity. Thus, before any stable calibration can be made, this erratic behavior must be overcome. This is accomplished in accordance with the present invention by exposing the sensor to an atmosphere of controlled relative humidity wherein the percent relative humidity is varied in a controlled manner from about 10 percent relative humidity to 90 percent relative humidity and back to 10 percent relative humidity through several cycles. The time allowed for each cycle for the humidity sensor has not been found to be critical and, normally, about 40 minutes is allowed. The curing environment may be created by any conventional method for proportioning known amounts of dry air and air saturated with water vapor into a chamber at a known temperature.

After the sensor has been exposed to several relative humidity cycles, the electrical leads 25 and 26 (FIG. 2), which may be any conventional electrical leads required to be compatible with the system in which the relative humidity sensor will be used, are attached to the electrodes 13 and 14, indicated at 27, in a well-known manner.

The sensor is then calibrated at 28 by returning it to a controlled humidity environment and utilizing conventional electrical methods to note the value of the resistance of the element at several relative humidity values to produce a calibration curve. Thus, the calibration device may include a conventional AC impedance bridge for measuring resistance and the values may be noted from a meter or recorded on a conventional round or strip chart recorder. In regard to the AC power used in calibration, it has been discovered that the actual resistance values obtained are somewhat dependent on the frequency used. As the frequency of the calibrating current is increased, the resistance decreases for a given relative humidity. Thus, when calibrating the sensor, the frequency of the AC power used should correspond to that which will exist in the circuit of ultimate use to assure an accurate calibration.

Figure 3:
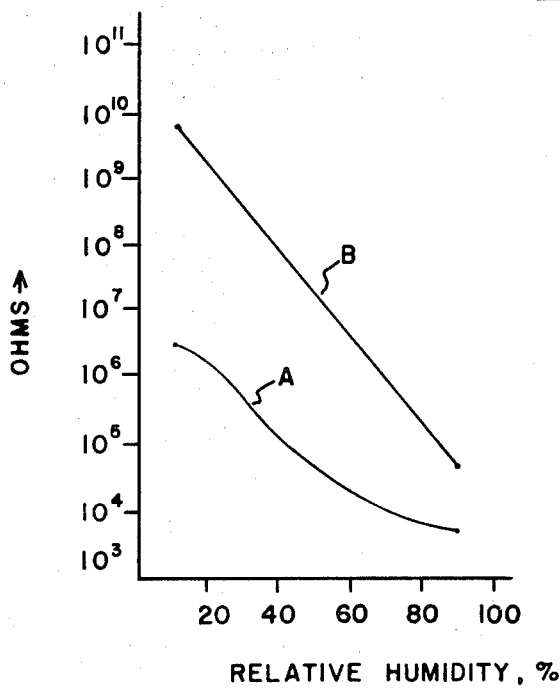
FIG. 3 is a graphical representation of a typical calibration curve relating the resistance of the sensor of the invention with corresponding relative humidity values and a similar curve for a typical untreated metal oxide type sensor.

In FIG. 3, there is shown at A a typical calibration curve relating the resistance of a sensor fabricated in accordance with the present invention to corresponding relative humidity values. A comparison curve is shown at B which relates the resistance of a typical untreated iron oxide type sensor with its corresponding relative humidity value. Both devices were calibrated using 60 Hz. AC power. This comparison dramatically illustrates the reduction of both the total resistance and the range over which such resistance varies with changing relative humidity accomplished by the sensor fabricated in accordance with the present invention. Thus, the resistance of the iron oxide coating in the low relative humidity range has been successfully reduced from values above $10^9$ ohms to slightly more than $10^6$ ohms and the range of values has been successfully reduced from more than five orders of magnitude to less than three orders of magnitude. This brings the value of the resistance of the sensor well within the scope of operation of ordinary electrical metering equipment. As indicated above, even lower resistance values can be obtained using AC frequencies above 60 Hz.

Sensors made in accordance with the present invention have been found to exhibit good stability over a fairly long period of time with very little shift from the original calibration curve. The high degree of chemical stability associated with the sensors of the invention also enables them to be used not only at the ambient temperatures normally associated with such devices but at considerably elevated temperatures, such as those found in ovens or the like, making the sensor of the invention far more versatile than any known prior device.

In addition, the response of the sensor of the invention to changes in relative humidity in the air to which it is exposed has been found to be extremely rapid when compared with that of other devices. As a result, it has also been found possible to coat the sensor of the present invention with a thin, moisture-permeable plastic membrane to enhance both its useful life and durability without seriously affecting the useful applications of the device. A thin layer of a material such as polyvinyl alcohol sheet, for example, has been found to allow ingress and egress of moisture to the sensor surface with a speed sufficient to maintain the response time of the device within the limits required for most applications.

The embodiments of the invention in which an exclusive property or right is claimed are defined as follows:

1. A moisture sensitive element comprising spaced metal electrodes, an electrically insulating metal oxide coating overlapping said electrodes, said oxide having an electrical resistance which is humidity-dependent, said coating being of a porous nature, and wherein the said metal oxide coating contains chlorine covalently bonded therein, thereby imparting an oxychloride structure thereto, and electrical leads attached to said electrodes.

2. A moisture sensitive element as claimed in claim 1, including a substantially inert dielectric blank member, and a noble metal electrode system applied to said blank member.

3. A moisture sensitive element as claimed in claim 1, wherein said metal oxide is one selected from the oxides of the elements contained in Group VIII, Period 4 of the Periodic Table of the Elements.

4. A moisture sensitive element as claimed in claim 2, wherein said metal oxide is $Fe_2O_3$.

5. A moisture sensitive element as claimed in claim 1, wherein said electrode system has an interdigital configuration.

6. A moisture sensitive element as claimed in claim 1, including a moisture-permeable membrane superimposed over the surface of said sensor.

* * * * *